April 21, 1936.  E. F. DALLAR  2,037,852
SCREWWORM FLY TRAP
Filed Jan. 11, 1935  5 Sheets-Sheet 1

Inventor
E. F. Dallar
By Clarence A. O'Brien
Attorney

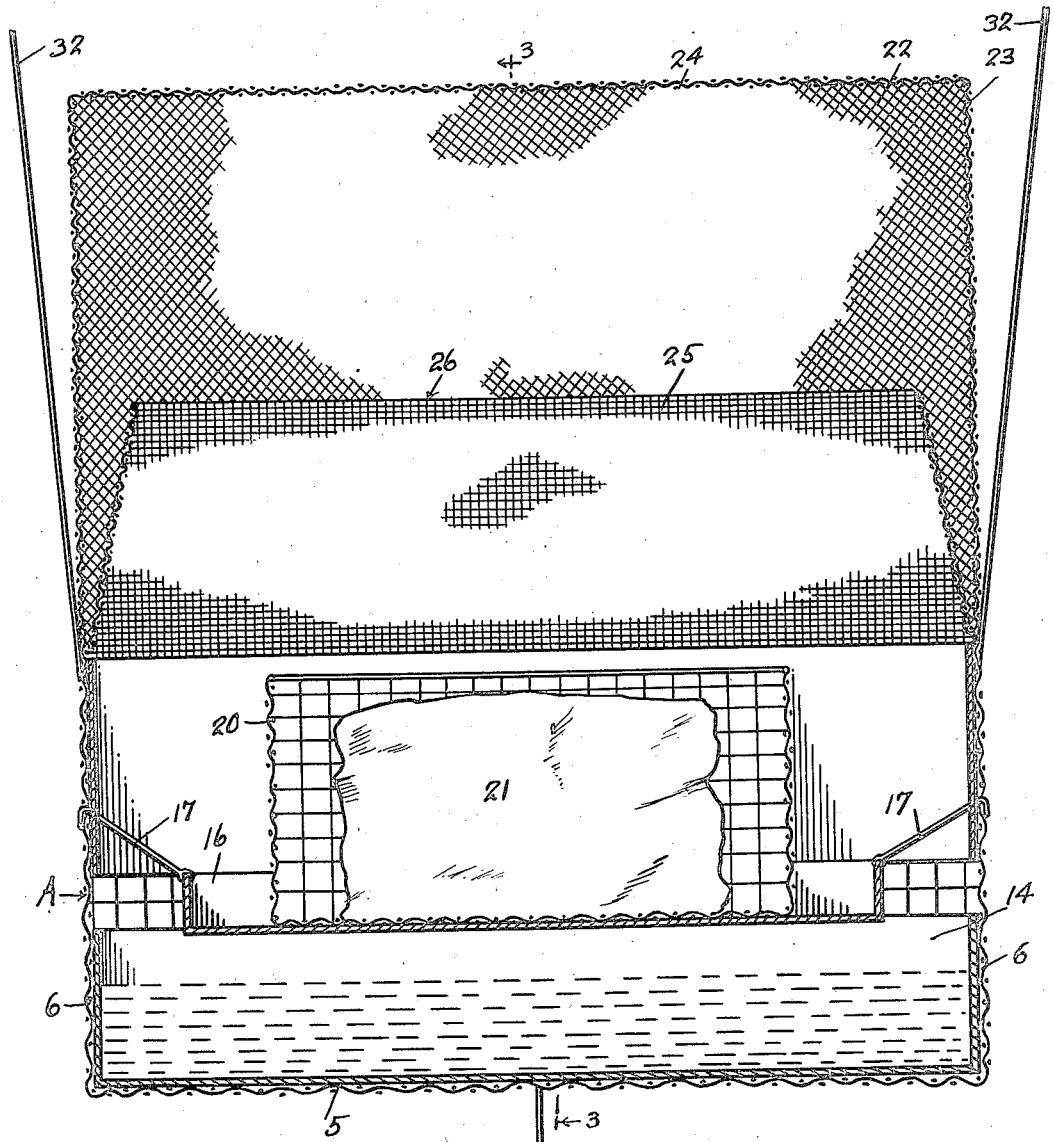

April 21, 1936.  E. F. DALLAR  2,037,852
SCREWWORM FLY TRAP
Filed Jan. 11, 1935  5 Sheets—Sheet 5
Fig. 5.
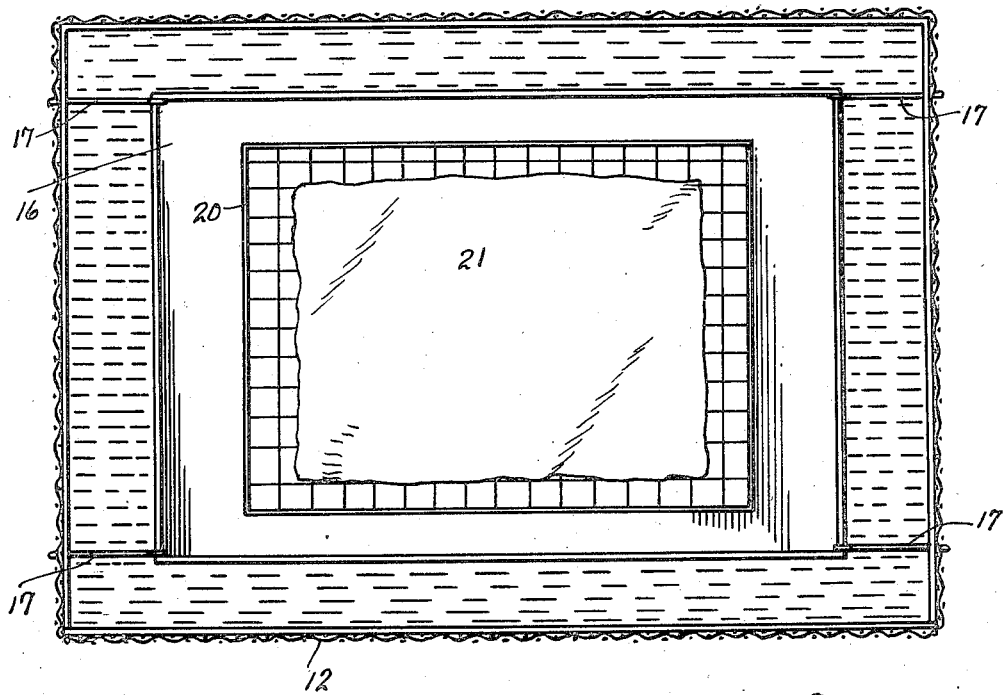
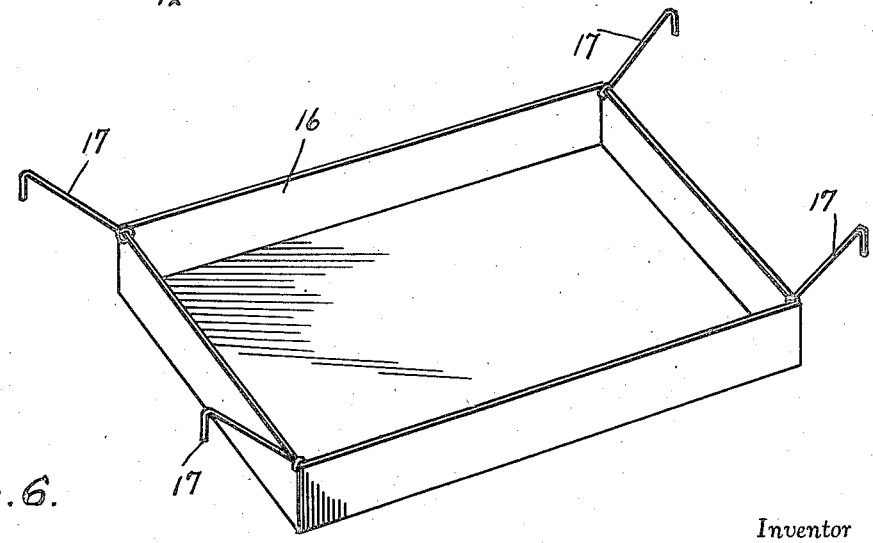
Fig. 6.
Inventor
E. F. Dallar
By Clarence A. O'Brien
Attorney Patented Apr. 21, 1936

2,037,852

UNITED STATES PATENT OFFICE 2,037,852

SCREWWORM FLY TRAP

Edward F. Dallar, Whigham, Ga.

Application January 11, 1935, Serial No. 1,419

2 Claims. (Cl. 43—118)

The present invention relates to a trap for destroying screw-worm flies and the object of the invention resides in the provision of a trap of this nature which is effective and efficient in destroying both the fly and the worm. To understand this object it must be borne in mind that the fly lays eggs in flesh and these eggs hatch into worms which in time will evolve into flies. As the worms mature, they wiggle out of the flesh and fall to the ground, where they hatch flies. The flies are caught in the upper portion of the trap while the worms are poisoned in the lower portion of the trap.

A further important object of the invention resides in the provision of a trap of this nature which is comparatively simple in its construction, inexpensive to manufacture, thoroughly reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 2 is a vertical longitudinal section therethrough.

Figure 5 is also a horizontal section taken substantially on the line 5—5 of Figure 3 looking downwardly.

Figure 6 is a perspective view of a tray.

Figure 1:
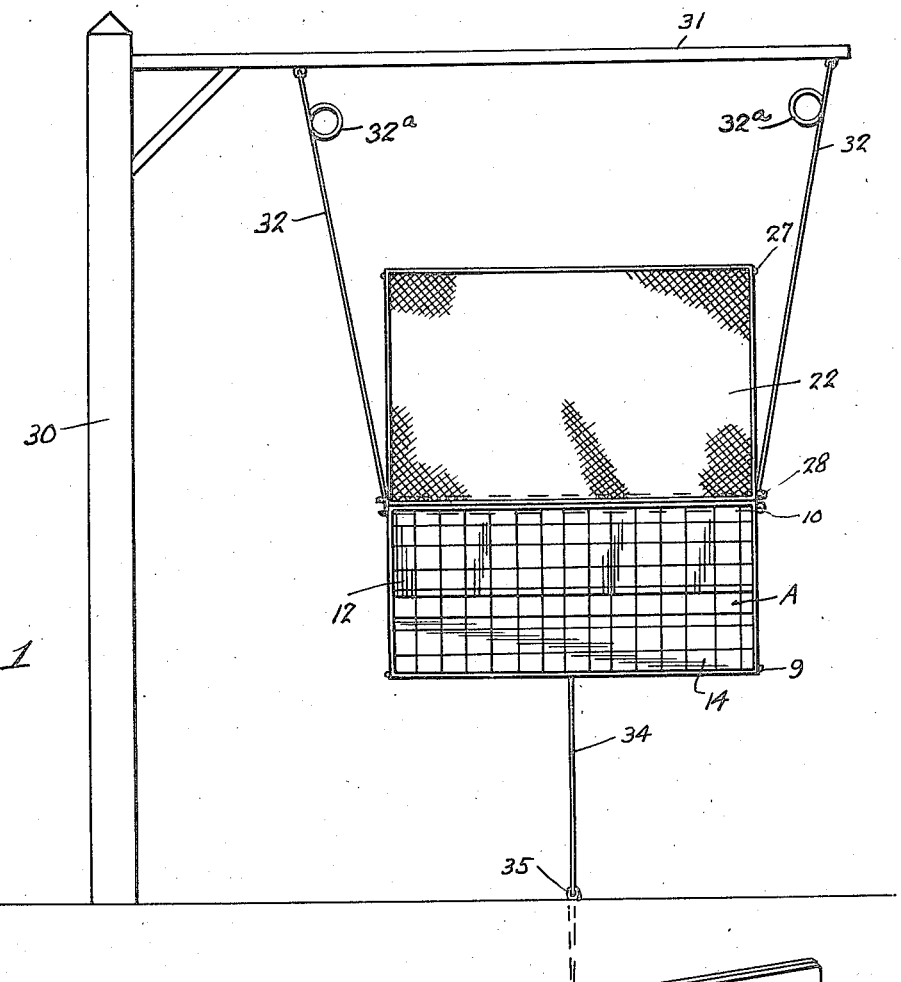
Figure 1 is an elevation of a trap embodying the features of my invention showing the same mounted on a support.
Figure 8:
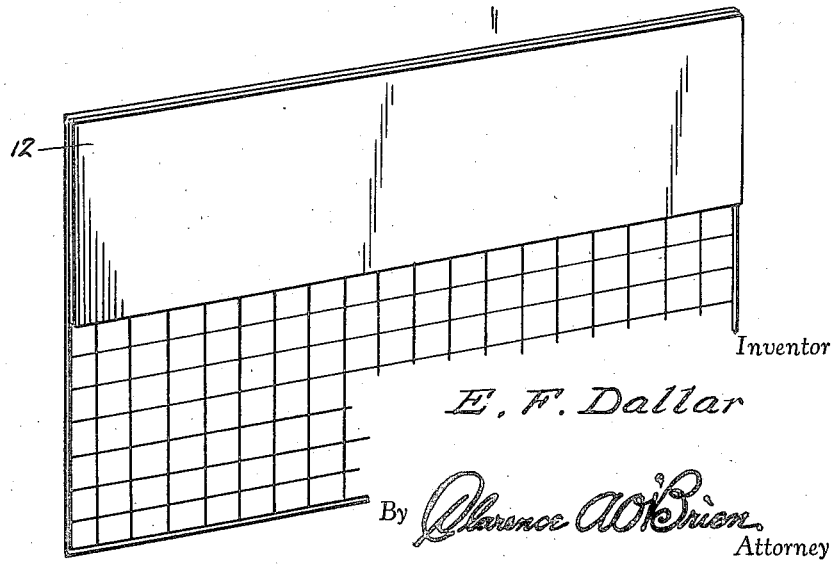
Figure 8 is a perspective view of one of the sides of the trap.
Figure 3:
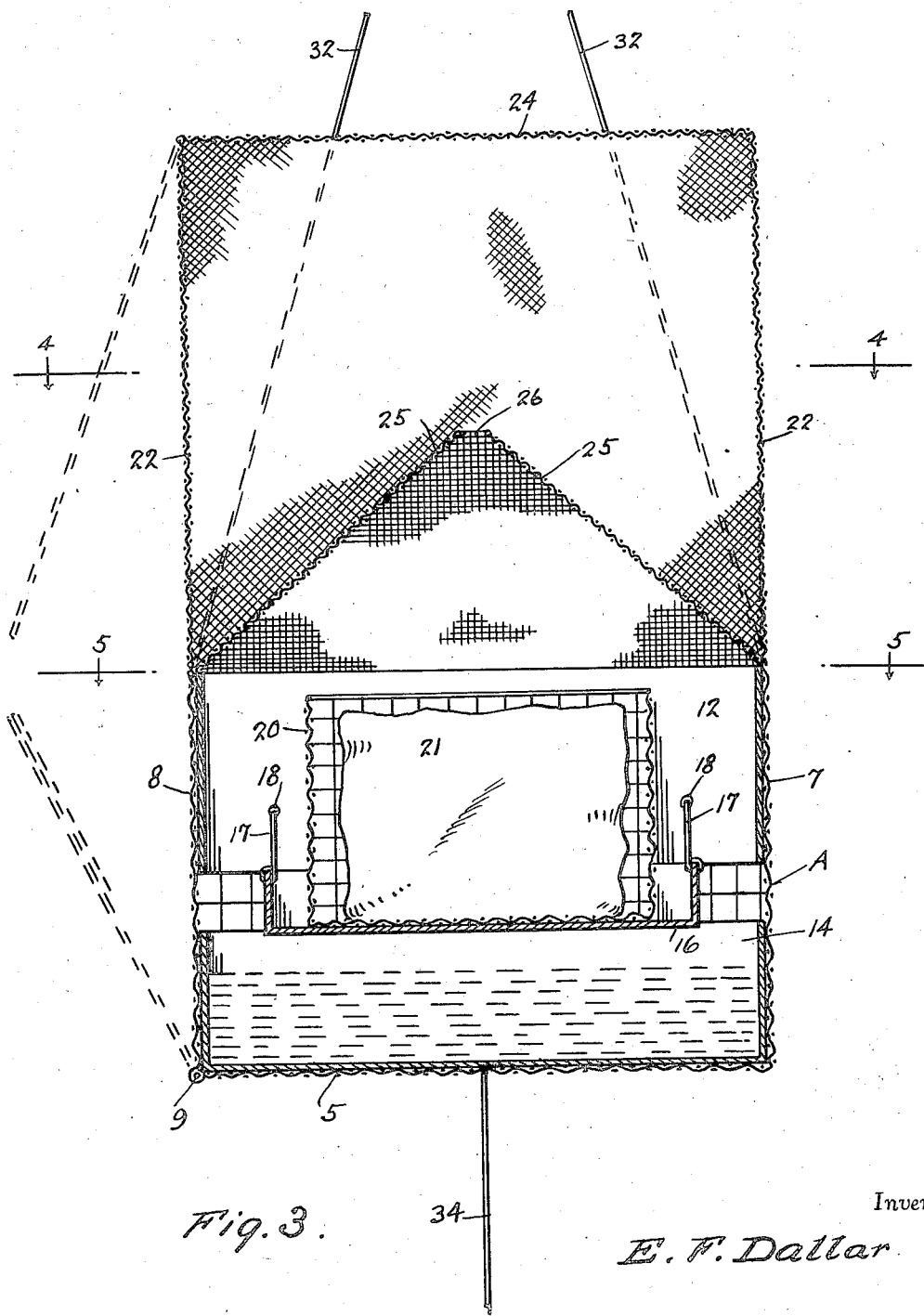
Figure 3 is a vertical section taken substantially on the line 3—3 of Figure 2.
Figure 4:
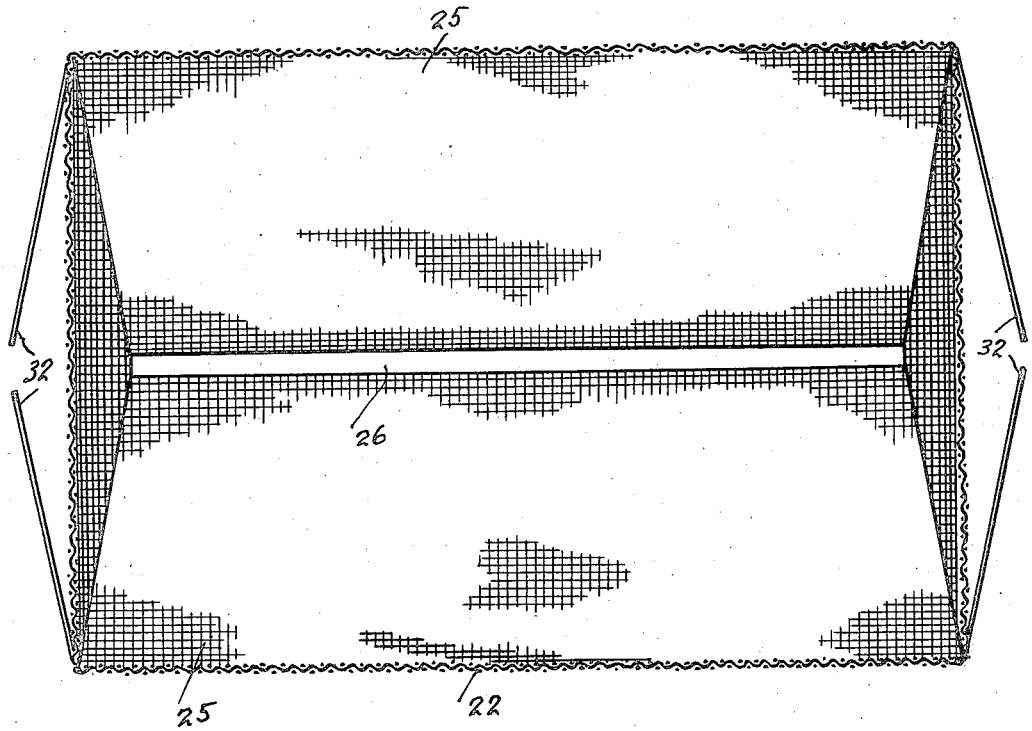
Figure 4 is a horizontal section taken substantially on the line 4—4 of Figure 3 looking downwardly.
Figure 7:
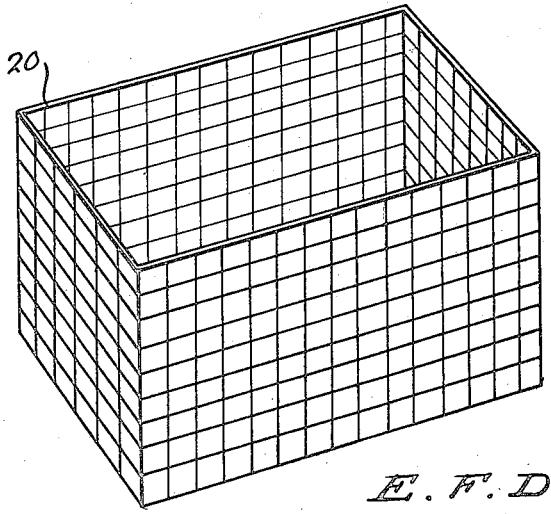
Figure 7 is a perspective view of a bait basket.

Referring to the drawings in detail, it will be seen that the lower portion of the trap is constructed of a relatively course mesh wire to include a bottom 5, ends 6—6 rising therefrom, a side 7 rising therefrom and a side 8 rising therefrom. Side 8 is hingedly connected as at 9 to the bottom 5 and is held in normal closed position by rods 10 or any other suitable means. The upper portions of the ends 6—6, side 7 and side 8 have on the inner surfaces thereof imperforate panels 12. A box like container 14 which may be made of tin, copper or any other suitable material, is mounted in the lower portion of the trap resting on the bottom 5 to catch falling worms from each bait basket 20, and the upper edge of this container 14 is disposed in spaced relation to the lower edge of the panels 12 as is shown to advantage in Figures 2 and 3, and the gauge of the mesh is sufficient so that the worms may pass therethrough. A pan 16 is mounted in the lower portion of the trap being suspended by hook-elements 17 which are engaged in openings 18 of the panels 12. A mesh wire basket 20 rests in the pan 16 and suitable bait 21 is mounted therein. This bait should preferably be meat.

Now referring to the upper structure of the trap. It will be seen that this is formed of mesh wire, the gauge of which is much smaller than that forming the sides and ends of the lower portion of the trap. This upper structure comprises side walls 22, end walls 23, a top 24 and a pair of panels 25. The panels 25 converge upwardly from the lower ends of the sides 22 and terminate so as to provide an exit 26.

One side 22 is hingedly mounted as at 27 and the lower end is held in normal closed position by a pin or rod 28.

Numeral 30 denotes a post from the upper portion of which extends horizontally a bracket arm 31. The trap is suspended from this bracket arm by cables, rods or the like 32, which are provided with handles 32a to permit the trap to be conveniently carried about when removed from the bracket arm 31. A cable or rod 34 is engaged with the central portion of the bottom 5 and is connected with the peg 35 in the ground. This is the preferable way of mounting the trap.

The fly enters the trap through the mesh A of ends 6—6, sides 7 or 8 and feeds on the bait 21. The eggs, which are laid by the fly, hatch out worms, which imbed themselves in the bait. When the worms are grown, they crawl out of the bait and drop into the container 14, in which is a suitable poisonous fluid as indicated to advantage in Figures 2 and 3. After the fly has finished laying eggs, it naturally rises upwardly between the mesh panels 25 and through the opening 26, where it is trapped in the upper portion of the trap. Insect powders or sprays are used in killing the flies so caught in the trap. It is apparent that in this manner, both the fly and the worm are destroyed.

It will be apparent that changes in the details of construction, and in the combination and arrangement of parts may be resorted to without departing from the spirit or scope of the invention as hereinafter claimed or sacrificing any of its advantages.

Having thus described the invention, what I claim as new is:

1. A screw-worm fly trap comprising a poison containing receptacle, a fly-trapping shell extending upwardly from the receptacle, a structure mounted in the shell, consisting of a pair of upwardly converging panels terminating at their upper edges in close spaced relation and meeting the side walls of the shell at their lower edges, a pan for supporting bait, hanger members engaged with the side walls of the shell and adapted for supporting the pan in the shell in a position above the bottom of the receptacle, one side of the shell being provided with a removable closure permitting access to the interior of the shell.

2. A screw-worm fly trap comprising a poison containing receptacle, a fly-trapping shell extending upwardly from the receptacle, a structure mounted in the shell, consisting of a pair of upwardly converging panels terminating at their upper edges in close spaced relation and meeting the side walls of the shell at their lower edges, a pan for supporting bait, hanger members engaged with the side walls of the shell and adapted for supporting the pan in the shell at a position above the bottom of the shell, one side of the shell being provided with a removable closure permitting access to the interior of the shell, said shell being of mesh construction, said hanger members being in the form of hooks pivotally secured to the bait pan and being engageable with the mesh construction of the shell.

EDWARD F. DALLAR.